(12) United States Patent
Wang et al.

(10) Patent No.: US 10,627,876 B2
(45) Date of Patent: Apr. 21, 2020

(54) ROTATABLE-TYPE LIQUID-COOLED HEAT SINK AND DISPOSITION METHOD FOR THE SAME

(71) Applicant: DELTA ELECTRONICS, INC., Taoyuan County (TW)

(72) Inventors: Hui-Hsiung Wang, Taoyuan County (TW); Meng-Sheng Chang, Taoyuan County (TW); Wei-Chien Ma, Taoyuan County (TW)

(73) Assignee: DELTA ELECTRONICS, INC., Taoyuan County (TW)

( * ) Notice: Subject to any disclaimer, the term of this patent is extended or adjusted under 35 U.S.C. 154(b) by 267 days.

(21) Appl. No.: 14/532,377

(22) Filed: Nov. 4, 2014

(65) Prior Publication Data
US 2016/0088768 A1    Mar. 24, 2016

(30) Foreign Application Priority Data
Sep. 24, 2014  (TW) ............................ 103132901 A

(51) Int. Cl.
  *G06F 1/20* (2006.01)
  *G03B 21/16* (2006.01)
(52) U.S. Cl.
  CPC ................ *G06F 1/20* (2013.01); *G03B 21/16* (2013.01); *G06F 2200/201* (2013.01)
(58) Field of Classification Search
  CPC ... G06F 1/16; G06F 1/20; G06F 1/203; G06F 1/206; G06F 2200/201; H01L 23/473; F28D 2021/0028; F28D 2021/0029; F28D 2021/0031; F28D 15/00; F25B 39/04; F25B 2339/046; F28F 7/00; H05K 7/20; H05K 7/20254

USPC .... 165/104.19, 104.21, 185, 104.32, 104.33; 361/699, 700, 709; 137/565.17
See application file for complete search history.

(56) References Cited

U.S. PATENT DOCUMENTS

| 6,166,907 A * | 12/2000 | Chien ................... F28D 1/0478 165/104.33 |
| 6,702,002 B2 * | 3/2004 | Wang .................... H01L 23/367 165/104.33 |
| 6,809,928 B2 * | 10/2004 | Gwin ........................ G06F 1/20 165/80.4 |
| 7,626,815 B2 * | 12/2009 | Stefanoski .............. G06F 1/187 361/679.47 |

(Continued)

FOREIGN PATENT DOCUMENTS

TW    M312704    5/2007

OTHER PUBLICATIONS

Office Action dated Jun. 6, 2016 from corresponding application No. TW 103132901.

*Primary Examiner* — Keith M Raymond
*Assistant Examiner* — Gustavo A Hincapie Serna
(74) *Attorney, Agent, or Firm* — Hauptman Ham, LLP

(57) ABSTRACT

A rotatable-type liquid-cooled heat sink and a disposition method for the same are provided. The liquid-cooled heat sink is disposed in a three-dimensional space and includes a pump, a liquid storage tank, a liquid-cooled head, a cooling module, and a plurality of pipes. The pipes communicatively couple the pump, the liquid storage tank, the liquid-cooled head, and the cooling module. Any of the liquid storage tank, the liquid-cooled head, the cooling module, and the pipes exceeds the pump in any of an X axis, a Y axis, a Z axis of a three-dimensional space.

6 Claims, 8 Drawing Sheets

(56) References Cited

U.S. PATENT DOCUMENTS

| | | | | |
|---|---|---|---|---|
| 7,918,799 B2* | 4/2011 | Haveri | ................ | A61B 8/4483 |
| | | | | 165/104.19 |
| 8,631,860 B2* | 1/2014 | Tang | ........................ | G06F 1/20 |
| | | | | 123/41.51 |
| 8,851,154 B2* | 10/2014 | Cheng | ................... | F21V 29/006 |
| | | | | 165/104.21 |
| 2004/0221604 A1* | 11/2004 | Ota | .................... | H05K 7/20781 |
| | | | | 62/259.2 |
| 2005/0081534 A1* | 4/2005 | Suzuki | ............... | F28D 1/05366 |
| | | | | 62/50.2 |
| 2005/0168939 A1* | 8/2005 | Iijima | ................ | F28D 1/05375 |
| | | | | 361/679.47 |
| 2007/0068653 A1* | 3/2007 | Kondou | ................ | F28D 1/0477 |
| | | | | 165/80.4 |
| 2007/0227710 A1* | 10/2007 | Belady | .................. | H05K 7/2079 |
| | | | | 165/122 |
| 2008/0169088 A1* | 7/2008 | Aoki | .................... | H01L 23/473 |
| | | | | 165/104.19 |
| 2008/0179044 A1* | 7/2008 | Hu | ....................... | H01L 23/473 |
| | | | | 165/80.4 |
| 2009/0044929 A1* | 2/2009 | Yeh | .................... | F28D 1/05391 |
| | | | | 165/104.19 |
| 2013/0068424 A1* | 3/2013 | Hwang | .................... | F28F 3/02 |
| | | | | 165/104.19 |
| 2013/0105119 A1* | 5/2013 | Hwang | .................. | F28D 15/00 |
| | | | | 165/104.19 |
| 2013/0220582 A1* | 8/2013 | Eriksen | ................ | H01L 23/473 |
| | | | | 165/104.31 |
| 2014/0069615 A1* | 3/2014 | Kusaka | ................ | H01L 23/473 |
| | | | | 165/104.19 |
| 2014/0138044 A1* | 5/2014 | Kawakami | ......... | B60H 1/00278 |
| | | | | 165/11.1 |

* cited by examiner

ROTATABLE-TYPE LIQUID-COOLED HEAT SINK AND DISPOSITION METHOD FOR THE SAME

BACKGROUND

1. Technical Field

The present invention relates to a cooling system and, in particular, to a rotatable-type liquid-cooled heat sink and a disposition method for the same.

2. Related Art

With the advancement of semiconductor technology, an electronic component has a smaller size and a greater radiation amount, thus causing difficulty in heat dissipation. The conventional heat sinks, such as heat dissipation fins, heat pipes, or fans, are inadequate. Therefore, liquid-cooled heat sinks were born which use pipes with coolant and push the coolant in the pipes by a pump to achieve heat sink circulations. The liquid-cooled heat sinks are becoming more widely used and more prevalent.

However, when the liquid-cooled heat sinks are applied to a desktop computer and etc., after the liquid-cooled heat sinks are installed in electronic heat radiation components of computers, such as CPU or GPU, their dispositions are not changed along with relocations of the computer. For example, they are not rotated with respect to the computer. However, if they are applied to apparatuses like a projector which can be laid on a desk or be hung from the ceiling, because the projector often needs to rotate by any angle to complete its installation according to the layout of the environment, or needs to operate in situations different from being laid on the desk, there are changes to the inside conditions of the liquid-cooled heat sink installed in the projector, causing the liquid-cooled heat sink to operate differently from its original design or causing unexpected problems in use.

The present liquid-cooled heat sink mainly includes a pump, a liquid storage tank, a liquid-cooled head, a cooling module, and a pipe portion connected to each of the aforesaid elements. The liquid storage tank provides coolant, and the pump moves the coolant to flow in the pipe portion, so that the coolant can bring away the heat which is absorbed by the liquid-cooled head contacting a heat source. Then, the coolant is cooled by passing through the cooling module. Such circulations can achieve liquid-cooled radiation effects. However, since the coolant has a thermal expansion feature, the coolant expands by heat under a high temperature operation environment. Therefore, usually a pressure reducing valve is incorporated into the design to overcome such a problem. But, in aforesaid situation that the liquid-cooled heat sink is applied to the projector or other apparatuses that may need to be rotated, the pressure reducing valve cannot function properly due to a liquid leakage problem resulted from rotating the projector or other apparatuses. To solve the problem, some space as a buffer space is reserved in the liquid-cooled heat sink for the expansion of the coolant when filling the coolant in the liquid-cooled heat sink.

Although the above-mentioned method solves the coolant expansion problem resulted from the improper functioning of the pressure reducing valve, as time goes by, some of the coolant of the liquid-cooled heat sink is evaporated due to heat when passing through the liquid-cooled head, thus inevitably leaving unnecessary air inside the liquid-cooled heat sink. If the unnecessary air is accumulated in the pump (e.g. when the pump is in a highest position in the whole liquid-cooled heat sink), the air in excess of an expected amount in the pump results in idling of the pump, so the pump can only move less coolant, thus affecting the radiation efficiency. The idling of the pump even results in malfunction of the pump, so the heat radiation requirement of the apparatus cannot be met, and also the apparatus malfunctions due to overheating.

In view of the foregoing, the inventor made various studies to improve the above-mentioned problems to realize the improvements, on the basis of which the present invention is accomplished.

BRIEF SUMMARY

It is an object of the present invention to provide a rotatable-type liquid-cooled heat sink and a disposition method for the same, which prevents a pump of the liquid-cooled heat sink from being in a highest position in the whole liquid-cooled heat sink no matter how it rotates to change its use state as required by the environment. Therefore, the air is prevented from being accumulated in the pump to cause its idling, malfunctioning, or other problems.

It is another object of the present invention to provide a rotatable-type liquid-cooled heat sink and a disposition method for the same, in which the liquid-cooled heat sink can be used non-directionally or multi-directionally, so the installation is not limited, and the liquid-cooled heat sink is more widely used or more prevalent in various occasions or situations.

Accordingly, the present invention provides a rotatable-type liquid-cooled heat sink comprising: a pump; a liquid storage tank; a liquid-cooled head; a cooling module; and a plurality of pipes communicating the pump, the liquid storage tank, the liquid-cooled head, and the cooling module. Any of the liquid storage tank, the liquid-cooled head, the cooling module, and the pipes exceeds the pump in any of an X axis, a Y axis, or a Z axis of a three-dimensional space.

Accordingly, the present invention provides a disposition method for a rotatable-type liquid-cooled heat sink, comprising following steps:

a) providing a pump, a liquid storage tank, a liquid-cooled head, and a cooling module;

b) disposing the pump, the liquid storage tank, the liquid-cooled head, and the cooling module in a three-dimensional space, any of the liquid storage tank, the liquid-cooled head, and the cooling module being exceeding the pump in any of an X axis, a Y axis, or a Z axis of a three-dimensional space;

c) using a plurality of pipes to communicate and position the pump, the liquid storage tank, the liquid-cooled head, and the cooling module.

DETAILED DESCRIPTION

In the following, detailed descriptions along with accompanied drawings are given to better explain the features and technical contents of the present invention. However, the following descriptions and the accompanied drawings are for reference and illustration only, and are not intended to limit the scope of the present invention.

Figure 1:
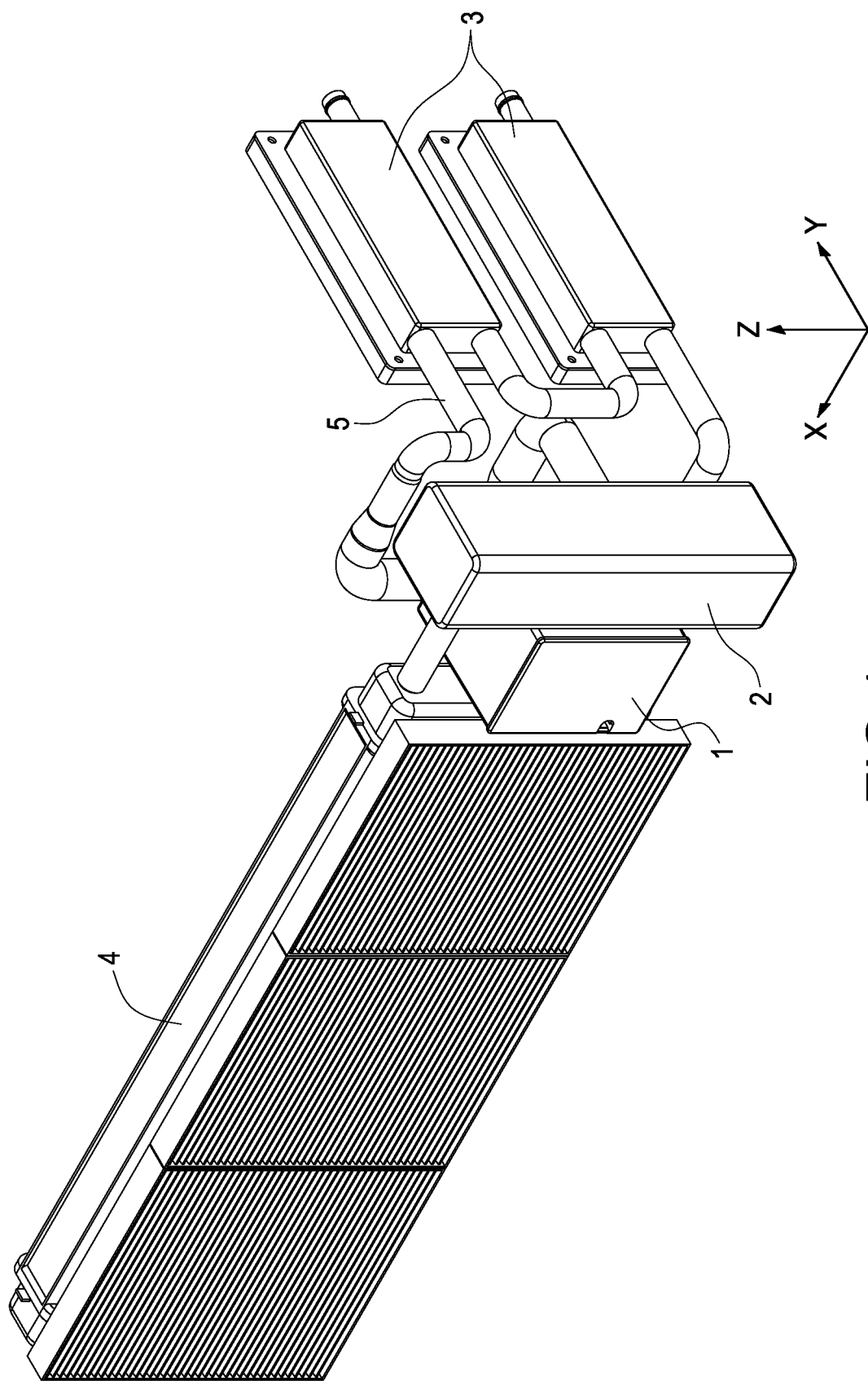
FIG. 1 is an appearance view of a liquid-cooled heat sink according to a preferable embodiment of the present invention.

Please refer to FIG. 1 which is an appearance view according to a preferable embodiment of the present invention. The present invention provides a rotatable-type liquid-cooled heat sink and a disposition method for the same. The liquid-cooled heat sink comprises: a pump 1; a liquid storage tank 2; a liquid-cooled head 3; a cooling module 4; and a plurality of pipes 5 communicating the pump 1, the liquid storage tank 2, the liquid-cooled head 3, and the cooling module 4. The present invention is characterized in that, the liquid-cooled heat sink is disposed in a three-dimensional space, and no matter how the liquid-cooled heat sink is rotated to change its use state as required by the environment, the pump 1 of the liquid-cooled heat sink is not in a highest position in the liquid-cooled heat sink, so the air is prevented from being accumulated in the pump 1.

Accordingly, the pump 1, the liquid storage tank 2, the liquid-cooled head 3, and the cooling module 4 are arranged in an L-shape. The liquid storage tank 2 is disposed between the liquid-cooled head 3 and the cooling module 4, so that the liquid-cooled head 3 is disposed to extend toward one end of the L-shape, and the cooling module 4 is disposed to extend toward the other end of the L-shape. The pump 1 is disposed between the liquid storage tank 2 and the cooling module 4. Therefore, through each pipe 5, the pump 1, the liquid storage tank 2, the liquid-cooled head 3, and the cooling module 4 are communicated to form a loop where coolant flows cyclically in the liquid-cooled heat sink.

Figure 2:
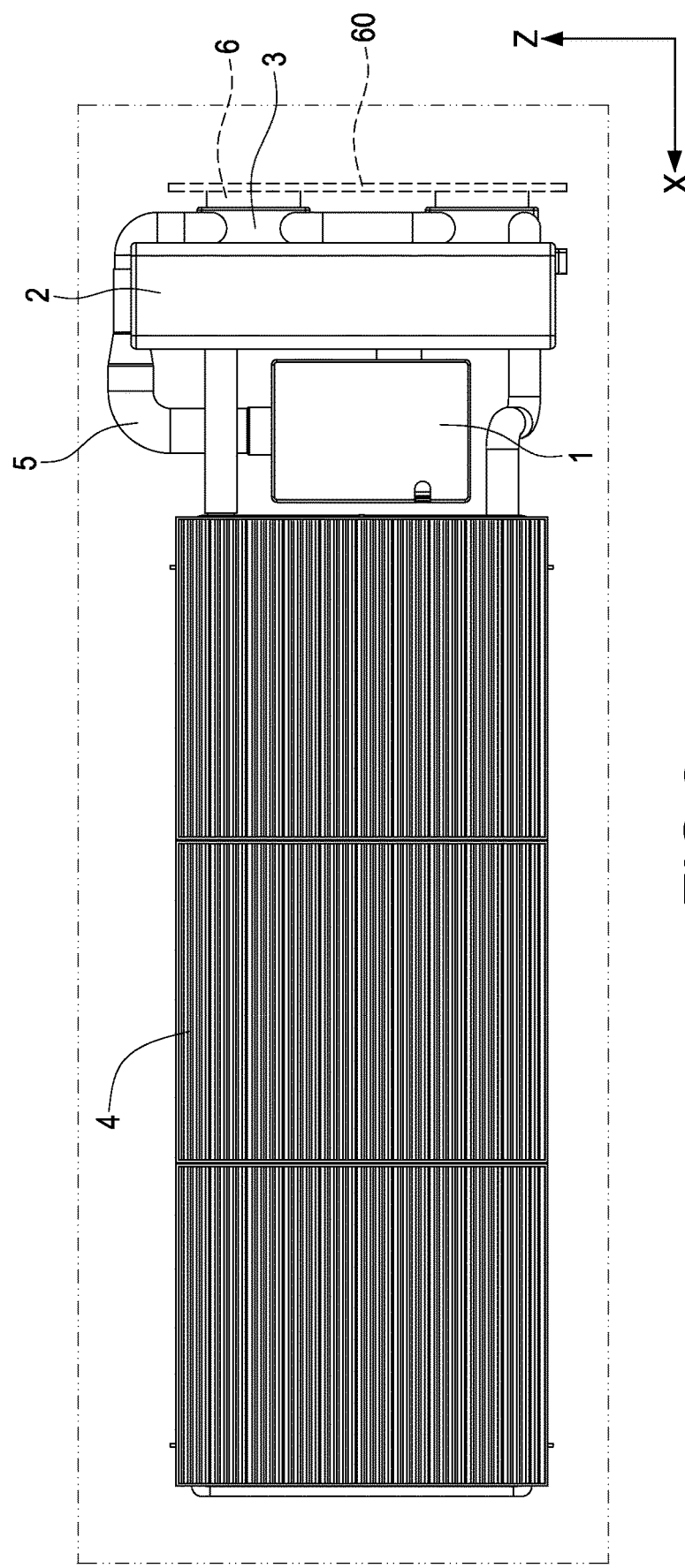
FIG. 2 is a first schematic use state view of the liquid-cooled heat sink of the present invention.

Referring to FIG. 1 and FIG. 2, the liquid-cooled heat sink is disposed in a three-dimensional space which has an X axis, a Y axis, and a Z axis. As shown in FIG. 2, the liquid-cooled heat sink is adapted for use with a heat source 6 disposed on a circuit board 60. The liquid-cooled head 3 contacts the heat source 6 to present a use state shown in FIG. 2. At this time, the X axis indicates a height direction. At least one of the liquid storage tank 2, the liquid-cooled head 3, and the cooling module 4 exceeds the pump 1 in the height direction. To be more specific, exceeding the pump 1 means that the length, width, or height of an inner space of the liquid-storage tank 2, the liquid-cooled head 3, or the cooling module 4 exceeds the corresponding length, width, or height of an inner space of the pump 1. Otherwise, the length, width, or height range together constituted by the liquid storage tank 2, the liquid-cooled head 3, and the cooling module 4 is greater than the corresponding length, width, or height of the pump 1.

Detailed descriptions are provided as follows, accompanied by FIGS. 3 to 7, to further explain that the liquid-cooled heat sink of the present invention certainly can prevent the pump 1 from being in the highest position.

Figure 3:
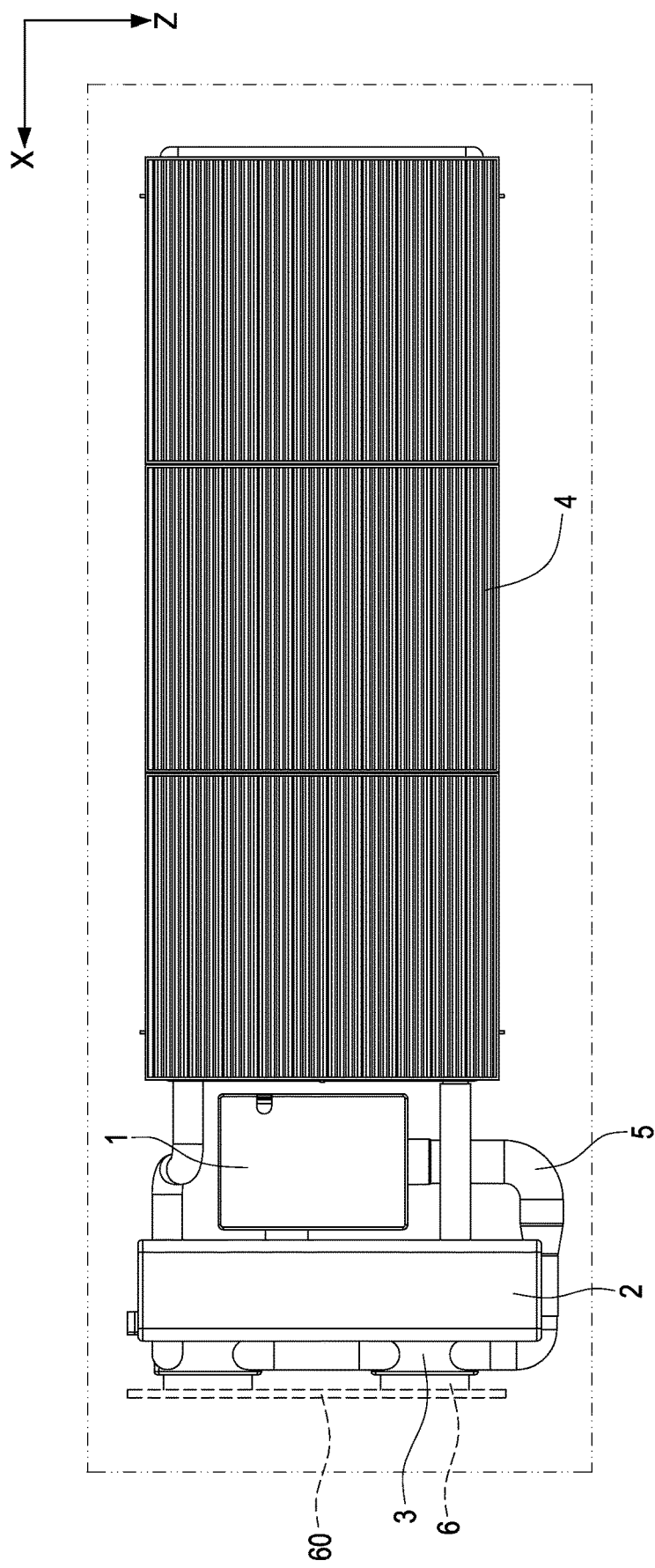
FIG. 3 is a second schematic use state view of the liquid-cooled heat sink of the present invention.

As shown in FIG. 3 which illustrates a use state after making a 180-degree rotation of FIG. 2, the X axis still indicates the height direction, just being an opposite direction. At this time, the liquid storage tank 2 or the liquid-cooled head 3 exceeds the pump 1 in the height direction indicated by the X axis.

Figure 4:
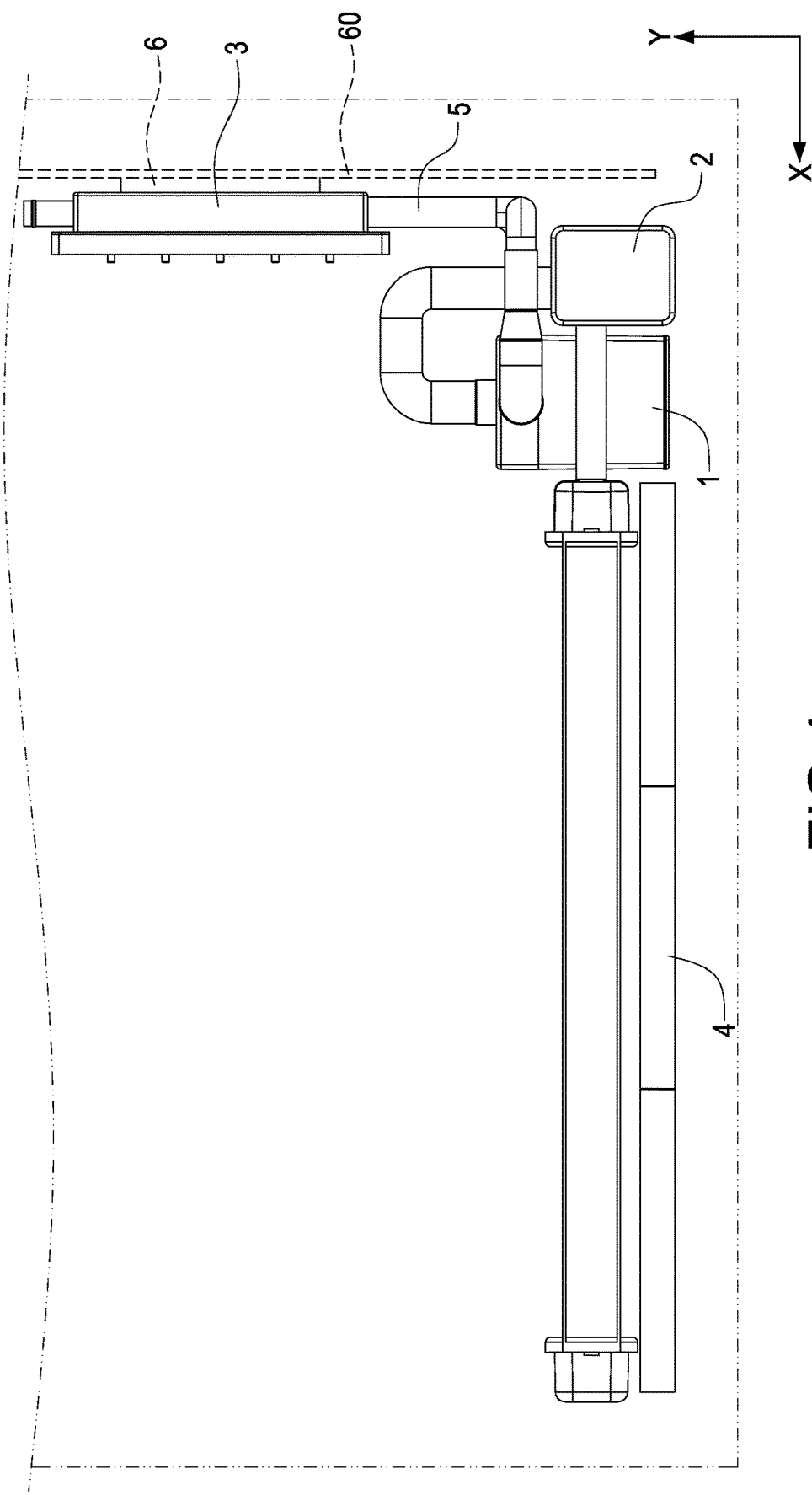
FIG. 4 is a third schematic use state view of the liquid-cooled heat sink of the present invention.
Figure 5:
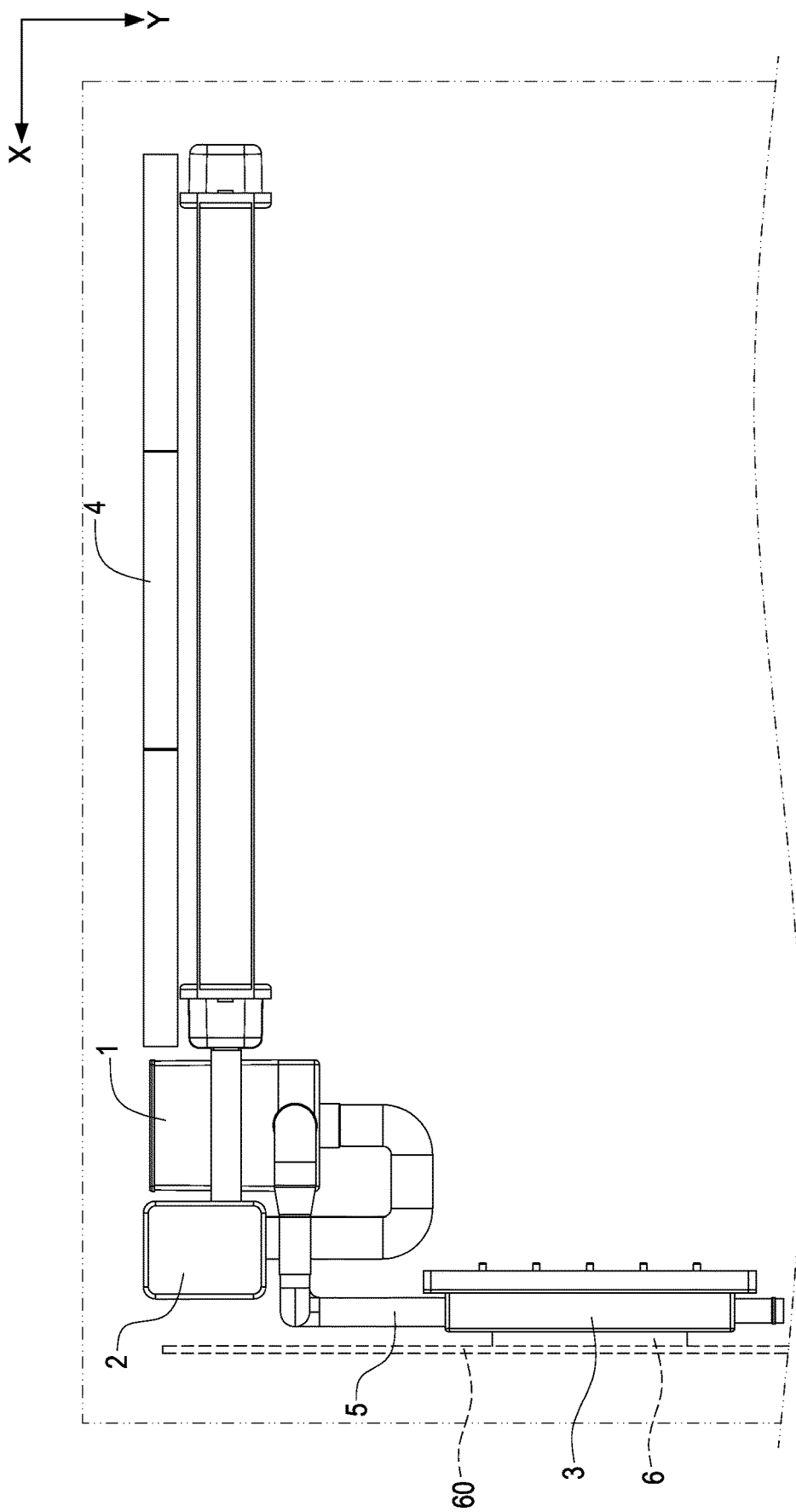
FIG. 5 is a fourth schematic use state view of the liquid-cooled heat sink of the present invention.

As shown in FIG. 4, if rotating to a use state in which the Y axis indicates the height direction, there is still the liquid-cooled head 3 that can exceed the pump 1. On the other hand, FIG. 5 shows a use state after making a 180-degree rotation of FIG. 4. In the Y axis opposite to the height direction of FIG. 4, the pump 1 still does not exceed the liquid storage tank 2 and the cooling module 4.

Figure 6:
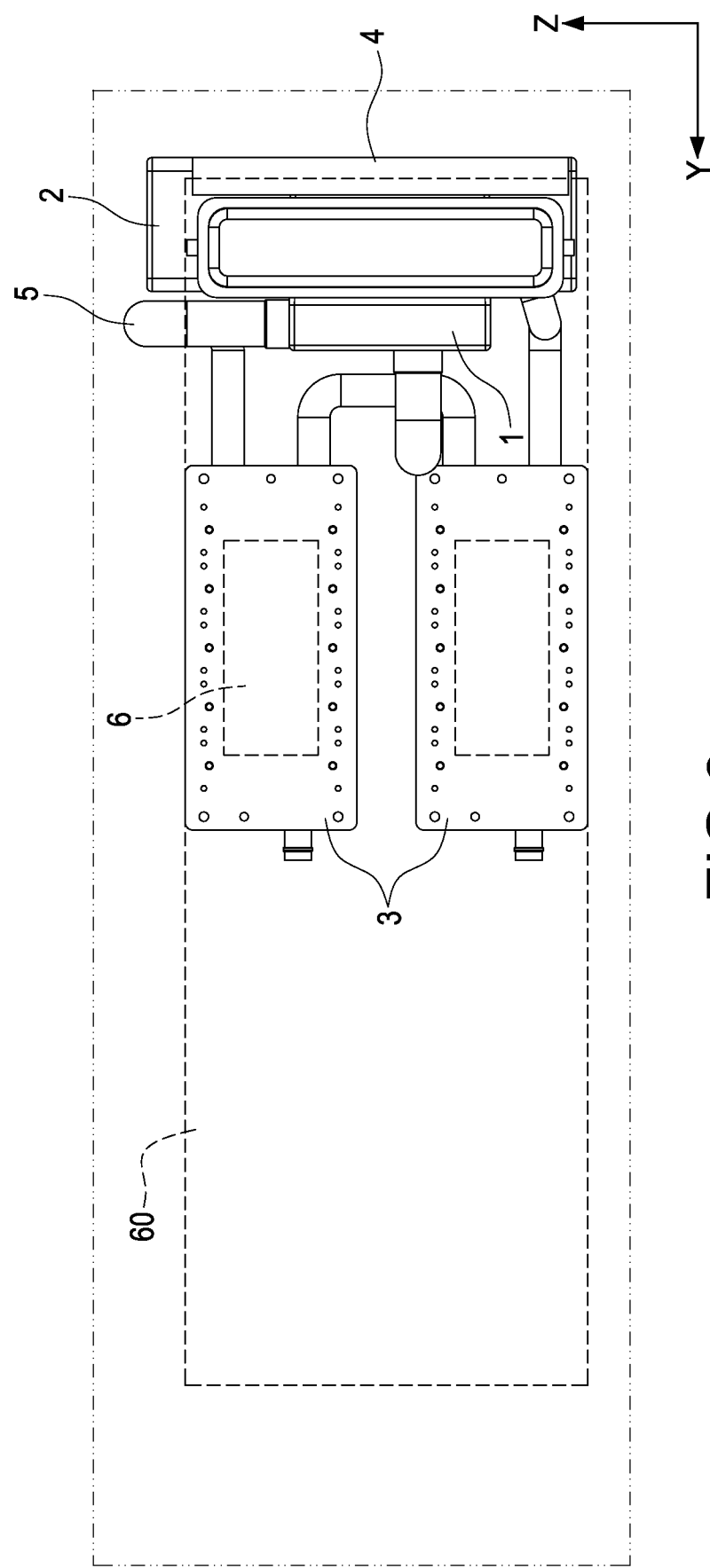
FIG. 6 is a fifth schematic use state view of the liquid-cooled heat sink of the present invention.
Figure 7:
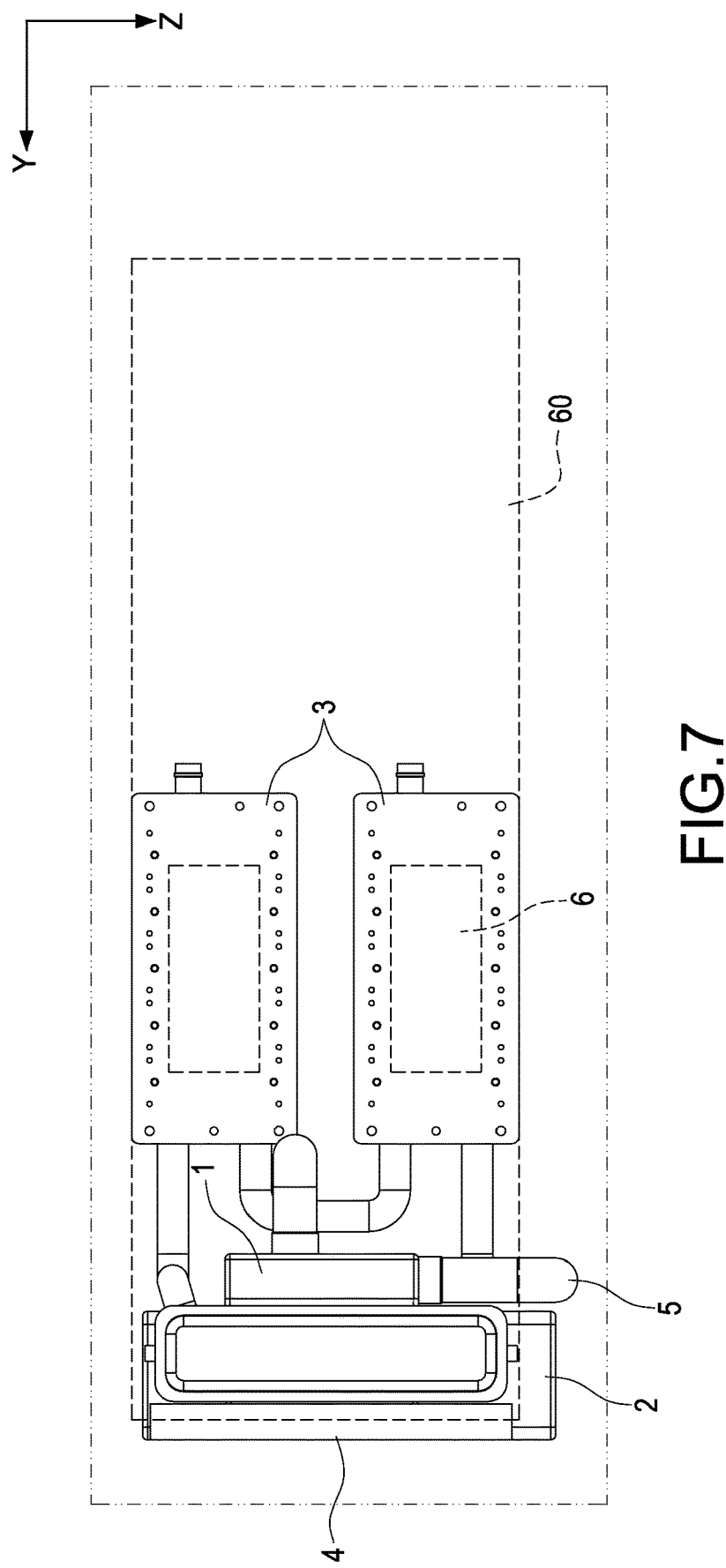
FIG. 7 is a sixth schematic use state view of the liquid-cooled heat sink of the present invention.

Referring to FIG. 6, if rotating to a use state in which the Z axis indicates the height direction, there are still the liquid storage tank 2 and the cooling module 4 that can exceed the pump 1. On the other hand, FIG. 7 shows a use state after making a 180-degree rotation of FIG. 6. In the Z axis opposite to the height direction of FIG. 6, the pump 1 still does not exceed the liquid storage tank 2 and the cooling module 4.

Figure 8:
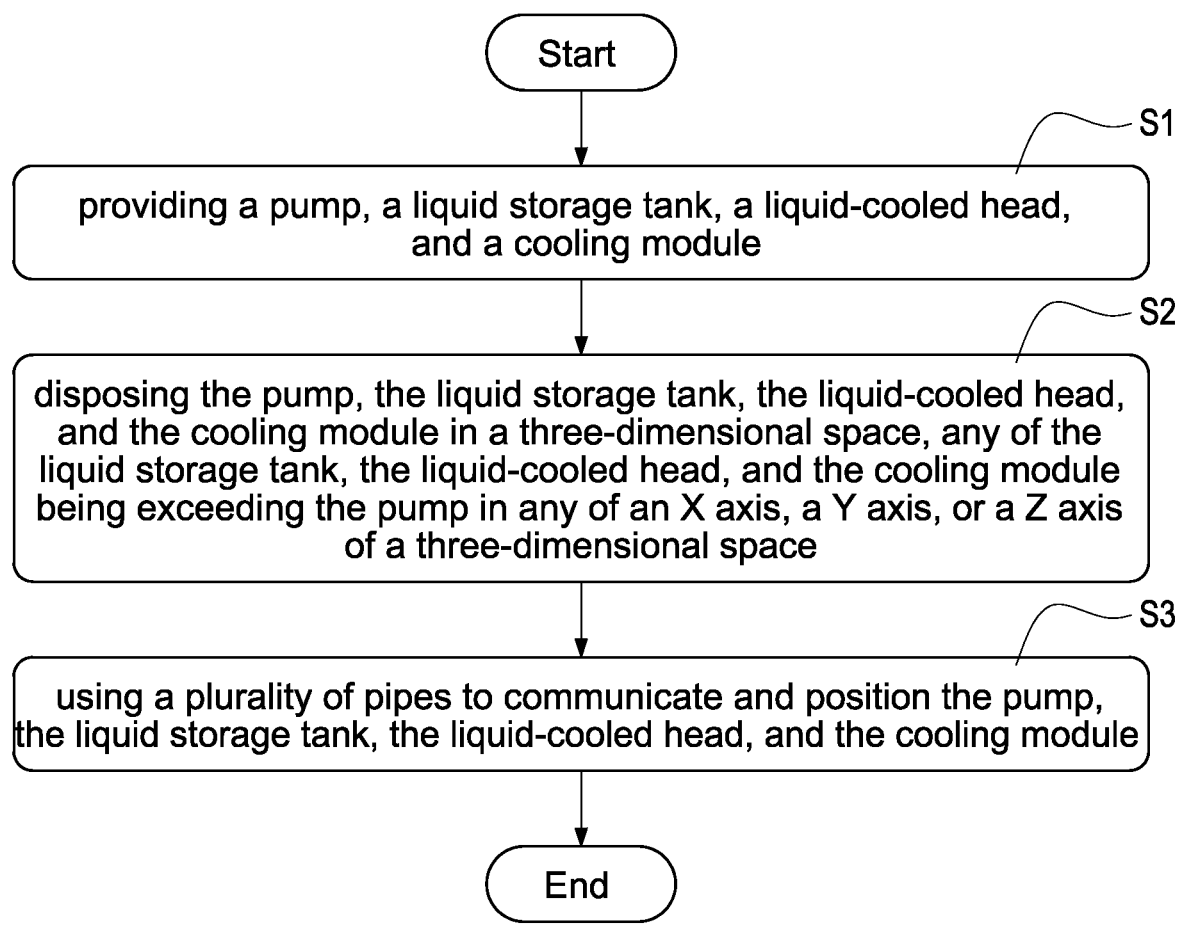
FIG. 8 is a flowchart depicting steps in a disposition method of the present invention.

Furthermore, as shown in FIG. 8, the present invention further provides a disposition method for the rotatable-type liquid-cooled heat sink, comprising following steps:

Step S1: Providing the pump 1, the liquid storage tank 2, the liquid-cooled head 3, and the cooling module 4, as shown in FIG. 1.

Step S2: Disposing the pump 1, the liquid storage tank 2, the liquid-cooled head 3, and the cooling module 4 in the three-dimensional space which has the X axis, Y axis, and Z axis, and any of the liquid storage tank 2, the liquid-cooled head 3, and the cooling module 4 exceeds the pump 1 in any of the X axis, Y axis, or Z axis of the three-dimensional space, as shown in FIGS. 2 to 7.

Step S3: Finally, using a plurality of pipes 5 to communicate and position the pump 1, the liquid storage tank 2, the liquid-cooled head 3, and the cooling module 4 to constitute the liquid-cooled heat sink.

Accordingly, on the basis of the above-mentioned structures, the present invention provides the rotatable-type liquid-cooled heat sink and the disposition method for the same.

Therefore, by using the rotatable-type liquid-cooled heat sink and the disposition method for the same, when the liquid-cooled heat sink is in use, the pump 1 is not in the highest position in the whole liquid-cooled heat sink no matter how the liquid-cooled heat sink is rotated as required by the environment, thereby preventing the air from being accumulated in the pump 1 to cause idling or malfunctioning of the pump 1. Moreover, because the liquid-cooled heat sink can be used non-directionally or multi-directionally, its assembly is not limited, and it is more widely used in various occasions and situations.

In summary, the present invention can certainly achieve the anticipated objects and solve the problems of conventional techniques, and has novelty and non-obviousness, so the present invention completely meets the requirements of patentability. Therefore, a request to patent the present invention is filed according to patent laws. Examination is kindly requested, and allowance of the present invention is solicited to protect the rights of the inventor.

It is to be understood that the above descriptions are merely preferable embodiment of the present invention and not intended to limit the scope of the present invention. Equivalent changes and modifications made in the spirit of the present invention are regarded as falling within the scope of the present invention.

What is claimed is:

1. A rotatable-type liquid-cooled heat sink, comprising:
a pump;
a liquid storage tank;
a liquid-cooled head;
a cooling module; and
a plurality of pipes communicatively coupling the pump, the liquid storage tank, the liquid-cooled head, and the cooling module,
wherein
the liquid storage tank, the liquid-cooled head, the cooling module, and the pipes exceed the pump in an X axis, a Y axis, and a Z axis of a three-dimensional space, the liquid storage tank is disposed between the liquid-cooled head and the cooling module so that the liquid-cooled head is disposed to extend toward one end, the cooling module is disposed to extend toward another end, and the pump is disposed outside the liquid storage tank and is between the liquid storage tank and the cooling module, the liquid storage tank and the cooling module exceed respective sides of the pump in the X axis, the liquid-cooled head and the cooling module exceed respective sides of the pump in the Y axis, and the pipes exceed the pump in the Z axis,
the pump is disposed between the liquid storage tank and the cooling module and the pump is separated from the cooling module,
the pump is communicatively coupled with the cooling module by way of two passages, a first passage of the two passages comprises a first pipe of the plurality of pipes that communicatively couples the pump with the liquid storage tank and a second pipe of the plurality of pipes that communicatively couples the liquid storage tank with the cooling module, and a second passage of the two passages comprises a third pipe of the plurality of pipes that communicatively couples the pump with the liquid-cooled head and a fourth pipe of the plurality of pipes that communicatively couples the liquid-cooled head with the cooling module, and
a position of the pump is below a highest position in the liquid-cooled heat sink regardless of an angle by which the liquid-cooled heat sink is rotated such that air is prevented from being accumulated in the pump.

2. The rotatable-type liquid-cooled heat sink of claim 1, wherein the pump, the liquid storage tank, the liquid-cooled head, and the cooling module are arranged in an L-shape on a plane formed by the X axis and the Y axis.

3. The rotatable-type liquid-cooled heat sink of claim 2, wherein the liquid storage tank is disposed between the liquid-cooled head and the cooling module, so that the liquid-cooled head is disposed to extend toward one end of the L-shape, and the cooling module is disposed to extend toward the other end of the L-shape.

4. A disposition method for a rotatable-type liquid-cooled heat sink, comprising the following steps:

a) providing a pump, a liquid storage tank, a liquid-cooled head, and a cooling module;
b) disposing the pump, the liquid storage tank, the liquid-cooled head, and the cooling module in a three-dimensional space, the liquid storage tank, the liquid-cooled head, and the cooling module exceeding the pump in an X axis, a Y axis, and a Z axis of the three-dimensional space;
c) using a plurality of pipes to communicatively couple and position the pump, the liquid storage tank, the liquid-cooled head, and the cooling module,
wherein
in step b), the liquid storage tank is disposed between the liquid-cooled head and the cooling module so that the liquid-cooled head is disposed to extend toward one end, the cooling module is disposed to extend toward another end, the pump is disposed outside the liquid storage tank and is between the liquid storage tank and the cooling module, the liquid storage tank and the cooling module exceed respective sides of the pump in the X axis, and the liquid-cooled head and the cooling module exceed respective sides of the pump in the Y axis, and the pipes exceed the pump in the Z axis,
the pump is disposed between the liquid storage tank and the cooling module and the pump is separated from the cooling module,
in step c), the pump is communicatively coupled with the cooling module by way of two passages, a first passage of the two passages comprises a first pipe of the plurality of pipes that communicatively couples the pump with the liquid storage tank and a second pipe of the plurality of pipes that communicatively couples the liquid storage tank with the cooling module, and a second passage of the two passages comprises a third pipe of the plurality of pipes that communicatively couples the pump with the liquid-cooled head and a fourth pipe of the plurality of pipes that communicatively couples the liquid-cooled head with the cooling module, and
a position of the pump is below a highest position in the liquid-cooled heat sink regardless of an angle by which the liquid-cooled heat sink is rotated such that air is prevented from being accumulated in the pump.

5. The disposition method for the rotatable-type liquid-cooled heat sink of claim 4, wherein in the step b), the pump, the liquid storage tank, the liquid-cooled head, and the cooling module are arranged in an L-shape on a plane formed by the X axis and the Y axis.

6. The disposition method for the rotatable-type liquid-cooled heat sink of claim 5, wherein in the step b), the liquid storage tank is disposed between the liquid-cooled head and the cooling module, so that the liquid-cooled head is disposed to extend toward one end of the L-shape and the cooling module is disposed to extend toward the other end of the L-shape.

* * * * *